United States Patent Office.

MICHAEL SCHALL, OF NEW YORK, N. Y.

Letters Patent No. 75,058, dated March 3, 1868.

---

IMPROVED COMPOSITION FOR FORMING CASTS AND FANCY ARTICLES.

---

The Schedule referred to in these Letters Patent and making part of the same.

---

TO ALL WHOM IT MAY CONCERN:

Be it known that I, MICHAEL SCHALL, of New York, in the county and State of New York, have invented a new and improved Composition for Casts and Fancy Articles; and I do hereby declare that the following is a full, clear, and exact description thereof, which will enable others skilled in the art to make and use the same, reference being had to the accompanying drawings, forming part of this specification.

This invention consists in forming a composition for making casts for toys and fancy articles, and it consists in forming the same of stearine and a substance known as "Krem's white," or "Krem's cement."

The stearine is melted over a slow fire, or at as low a temperature as possible. To the stearine thus liquefied is now added, and thoroughly stirred in, about half its weight of finely-powdered "Krem's white," or "Krem's cement," or so much of it as may be necessary to produce a thick paste. When this is done, stearine is again added in small portions, until the composition shows that it can be easily and smoothly moulded or cast into various forms, such as fancy articles, toys, &c.

Upon the thirtieth of June, 1863, Letters Patent were granted me for a composition for the same purpose, in which terra alba was employed instead of Krem's white. I have found that by using Krem's white, or Krem's cement, a stronger and much more beautiful article is formed.

I do not confine myself to any particular proportions in forming the present composition, as the articles manufactured from it require different degrees of strength and hardness.

Having described my invention, what I claim as new, and desire to secure by Letters Patent, is—

A composition formed of the ingredients herein named, for the purposes described.

The above specification of my invention signed by me, this 11th day of January, 1868.

MICHAEL SCHALL.

Witnesses:
 WM. F. McNAMARA,
 ALEX. F. ROBERTS.